March 3, 1964
H. W. BORK
3,123,109
MEANS FOR PREVENTING LOSS OF LUBRICANT IN GEAR CHAMBERS
Filed Jan. 17, 1962
2 Sheets-Sheet 1
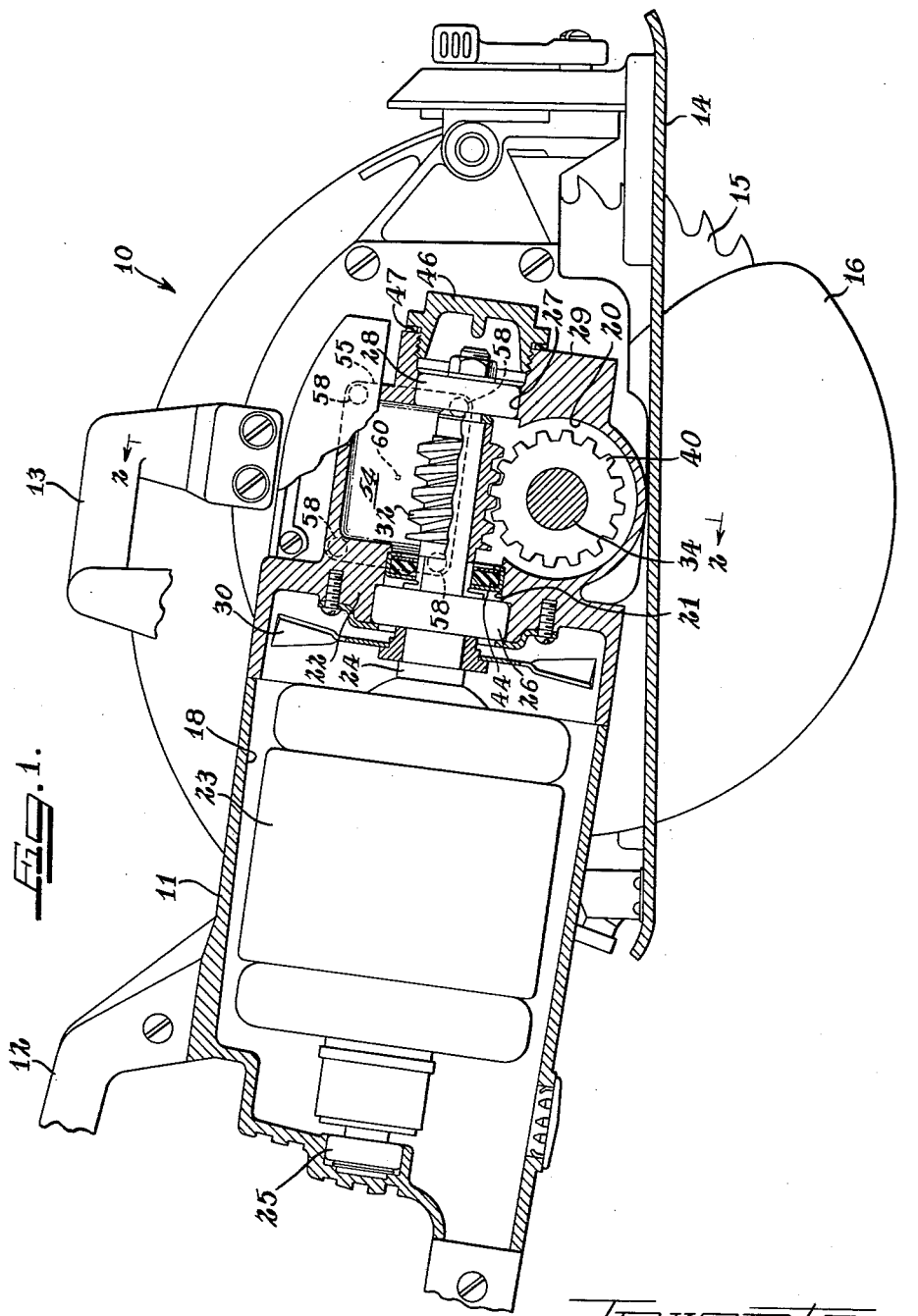
INVENTOR
HUGO W. BORK
BY Cromwell, Greist & Warden
ATTYS.

March 3, 1964 H. W. BORK 3,123,109
MEANS FOR PREVENTING LOSS OF LUBRICANT IN GEAR CHAMBERS
Filed Jan. 17, 1962 2 Sheets-Sheet 2
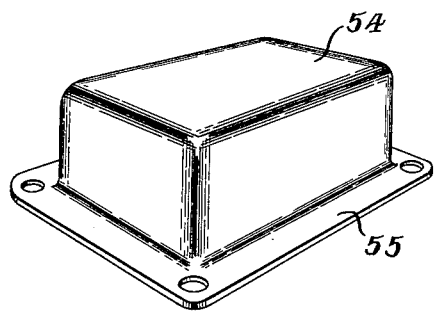
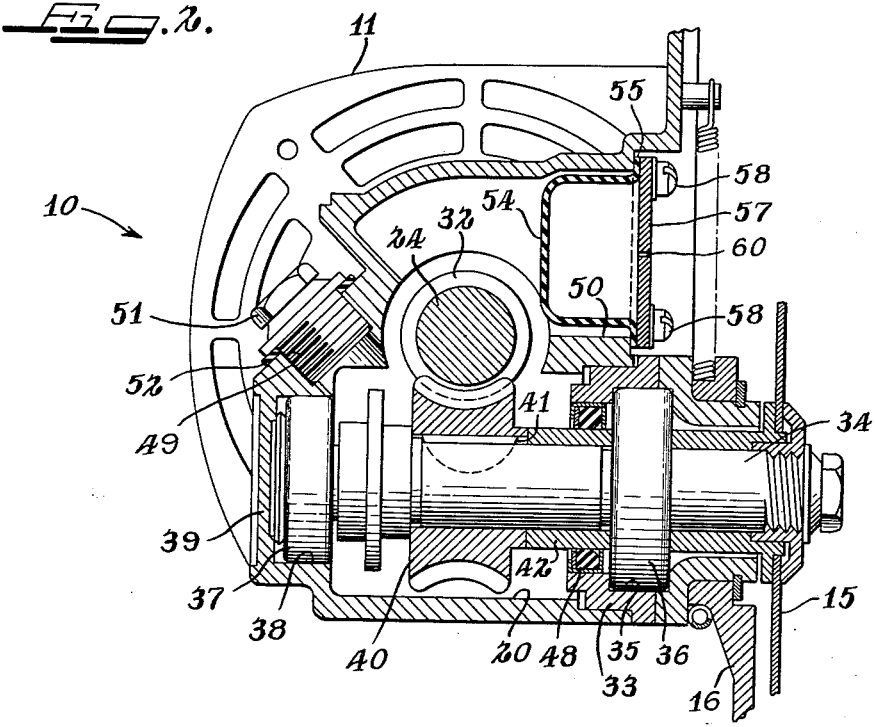
Inventor
HUGO W. BORK
Cromwell, Greist & Warden
Attys.

United States Patent Office 3,123,109
Patented Mar. 3, 1964

3,123,109
MEANS FOR PREVENTING LOSS OF LUBRICANT IN GEAR CHAMBERS
Hugo W. Bork, Chicago, Ill., assignor to Skil Corporation, Chicago, Ill., a corporation of Delaware
Filed Jan. 17, 1962, Ser. No. 166,874
5 Claims. (Cl. 143—33)

The present invention is directed to gear chambers for power tools and the like and, more particularly, to an improvement in such gear chambers.

As is well known in the art, gear chambers for power tools and the like are provided with a number of openings in the walls thereof through which various shafts extend into the gear chambers and also for the purpose of introducing lubricant therein, etc. All of such openings are normally provided with plugs or sealing members of various types whereby to prevent leakage of the lubricant from the gear chamber. However, after an extended period of operation of such power tools or the like, the air and lubricant in the gear chamber heat up and expand, thus putting increased pressure on the various plugs and sealing members which, in many cases, results in leakage of the lubricant therepast. Such lubricant leakage is, of course, very objectionable.

It is, therefore, the general object of the present invention to provide a new and novel improvement in gear chambers for power tools and the like which eliminates the problem of lubricant leakage even after an extended period of operation of the power tool or the like.

A more detailed object of the present invention is to provide in gear chambers for power tools and the like a collapsible diaphragm having an open side secured against a portion of the inner wall surface of the gear chamber having a small opening to atmosphere formed therein, whereby an increase in pressure within the gear chamber results in collapsing of the diaphragm whereby to relieve the pressure increase from the various types of sealing members provided in the usual wall openings of the gear chamber.

Certain other objects of the invention will, in part, be obvious, and will in part appear hereinafter.

For a more complete understanding of the nature and scope of the invention reference may now be had to the accompanying drawings wherein:

FIG. 1 is a generally central longitudinal vertical section taken through a hand operable power saw having a gear chamber embodying the improvement of the present invention with a portion of the handgrips of the power saw being broken away;

FIG. 2 is a generally vertical transverse section taken generally along the line 2—2 of FIG. 1; and FIG. 3 is an enlarged perspective view of the collapsible diaphragm shown in FIGS. 1 and 2.

As illustrated in FIGS. 1 and 2, the improved gear chamber of the present invention is shown as incorporated in a hand operable power saw 10. The power saw 10, which is of a conventional design, includes a main housing 11, handgrips 12 and 13 (partially broken away), a guide plate 14, a rotary saw blade 15, and a blade guard 16.

The main housing 11 is characterized by a motor chamber 18 and a gear chamber 20 with an opening 21 being provided in the wall structure 22 therebetween. A conventional motor 23 disposed in the motor chamber 18 is provided with a drive shaft 24 having its rear end supported in a bearing 25 in a known manner. The drive shaft 24 extends into the gear chamber 20 through the opening 21 in the wall structure 22 between the motor and gear chambers 18 and 20, respectively, and is supported in the opening 21 by a bearing 26. The opposite end of the drive shaft 24 extends through the gear chamber 20 and into an opening 27 formed in the front wall 29 of the gear chamber 20 with the forward end of the drive shaft 24 being supported in the opening 27 by a bearing 28. A fan wheel 30 is mounted on the motor drive shaft 24 within the motor chamber 18 and a conventional worm 32 is secured on the portion of the motor drive shaft 24 which extends through the gear chamber 20.

The saw blade 15 is mounted in a known manner on the end of a driven saw shaft 34 which extends into the gear chamber 20 beneath and in a direction transversely of the motor drive shaft 24 through an opening 35 provided in a side wall 33 of the gear chamber 20. The saw shaft 34 is supported in the opening 35 by a bearing 36 with the end of the saw shaft 34 opposite the saw blade 15 being supported in a bearing 37 suitably mounted in a recess 38 provided in the inner surface of a side wall 39 of the gear chamber 20. A worm gear 40 is secured on the saw shaft 34 within the gear chamber 20 by a key 41 with the worm gear 40 being disposed in meshed driving engagement with the worm 32. A sleeve member 42 is provided on the shaft 34 between the worm gear 40 and the bearing 36. Thus, in a manner well known in the art, during operation of the motor 23, the worm gear 40 is rotated by the worm 32 whereby to rotate the saw shaft 34 and the saw blade 15 mounted on the end thereof.

As shown in FIG. 1, an annular sealing member 44 of known type is provided in the opening 21 about the motor drive shaft 24 to prevent the leakage of lubricant therethrough. To seal the opening 27 in the front wall 29 of the gear chamber 20, a plug 46 and a conventional sealing gasket 47 are provided. As shown in FIG. 2, an annular sealing member 48 like the sealing member 44 is provided in the opening 35 about the sleeve member 42 whereby to prevent the leakage of lubricant therethrough. With further reference to FIG. 2, it is noted that the side walls 39 and 33 of the gear chamber 20 are provided with a pair of openings 49 and 50, respectively, with the opening 50 being provided in the upper portion of the gear chamber 20. The opening 49 is closed by a plug member 51 having a conventional sealing gasket 52 associated therewith.

Assuming the opening 50 to be closed by a conventional plate member having a suitable sealing gasket associated therewith, it is noted that all of the openings in the walls of the gear chamber 20 are provided with sealing members of various types whereby to presumably prevent the leakage of lubricant from the gear chamber 20. However, it has been found that as the air and lubricant in the gear chamber 20 heat up, as for instance after an extended period of operation of the power saw 10, they expand whereby to increase the pressure on the various sealing members and, in many cases, cause leakage of lubricant past the various sealing members.

The present invention is primarily concerned with an improvement in gear chambers of the character described whereby to eliminate the problem of leakage of the lubricant therefrom as a result of an increase in pressure within the gear chamber. As best illustrated in FIG. 2, a collapsible bellows or diaphragm 54, which is preferably formed of neoprene or of a similar rubber-like material, is provided in the opening 50 in the upper portion of the side wall 33 of the gear chamber 20. As best illustrated in FIG. 3, the diaphragm 54 is generally concave shaped or box-like in configuration with an open side and an outwardly directed marginal or peripheral flange portion 55 provided adjacent the latter. It is to be understood that for gear chambers of different designs, diaphragms of different sizes and configurations may, of course, be provided.

As illustrated in FIG. 2, the diaphragm 54 is of a size to be positioned in the opening 50 in the side wall 33 of the gear chamber 20 with the main body portion of the diaphragm 54 projecting into the gear chamber 20 and with the flange portion 55 thereof disposed against the outer edge surface of the opening 50. A plate member 57 is secured over the open side of the diaphragm 54 and the outer end of the opening 50, as a closure therefor, by conventional fasteners 58, thus clamping the flange portion 55 of the diaphragm 54 tightly against the outer edge surface of the opening 50 with the flange portion 55 thus acting as a sealing member. The plate member 57 is provided with a small opening 60 to atmosphere in the portion thereof disposed adjacent the open side of the diaphragm 54.

With the improved gear chamber arrangement disclosed herein, an increase in pressure within the gear chamber 20 due to an increase in temperature of the air and lubricant therein during operation of the power saw 10 will result in collapsing of the diaphragm 54 sufficiently to relieve the increase in pressure from the various sealing members closing the many openings in the wall structure of the gear chamber 20 and thus prevent leakage of the lubricant from the gear chamber 20 past the sealing members.

It is to be understood that a diaphragm, such as the diaphragm 54, could also be positioned with its open side disposed against a fixed inner wall surface of a gear chamber as long as a small opening to atmosphere is provided in the portion of the wall disposed within the periphery of the open side of the diaphragm.

It will be understood that certain changes may be made in the construction or arrangement of the gear chamber improvement disclosed herein without departing from the spirit and scope of the invention as defined in the appended claims.

I claim:

1. In a power saw characterized by a main housing having a gear chamber formed therein, a motor in the main housing having a drive shaft projecting into the gear chamber with a worm secured thereon, a saw blade mounted on a shaft which extends into the gear chamber and has a worm gear secured therein and disposed in meshed driving engagement with the worm, and by sealing members provided about the motor drive shaft and the saw blade shaft and for other openings in the gear chamber wall structure for preventing the leakage of lubricant from the gear chamber, which sealing members may not be wholly effective upon an increase in pressure within the gear chamber due to a rise in temperature of the air and lubricant therein after an extended period of operation of the power saw, the improvement which comprises, one wall of said gear chamber having an opening extending therethrough in the upper portion of said gear chamber, a plate member disposed against the outer end of said wall opening to provide a closure therefor and having a small opening to atmosphere formed therein, fastener means securing said plate member against the outer end of said wall opening, a collapsible generally box-like open-sided diaphragm formed of a rubber-like material provided in said gear chamber and having its open side disposed against the inner surface of said plate member about said opening to atmosphere formed therein, and an outwardly directed peripheral integral flange portion disposed adjacent the open side of said diaphragm, which flange portion is clamped against the outer end of said wall opening in said gear chamber by said plate member, said diaphragm being collapsible to compensate for an increase in pressure within the gear chamber of the power saw whereby to render the sealing members in the wall openings of the gear chamber more effective to prevent leakage of lubricant from the gear chamber by relieving the increased pressure on said sealing members.

2. In a closed gear chamber of a power tool or the like wherein sealing gaskets, plugs and the like are provided to seal openings in the walls of the gear chamber to prevent leakage of lubricant from the latter, the improvement which comprises, a wall portion of said gear chamber being provided with a small opening to atmosphere, a collapsible diaphragm within said gear chamber, which diaphragm is generally concave shaped on the atmosphere side having a continuous marginal portion in sealing engagement with said wall portion around the opening formed therein for defining a collapsible chamber within said gear chamber, said diaphragm being collapsible in response to an increase in pressure developed in said gear chamber.

3. In a gear chamber of a power tool or the like wherein sealing gaskets, plugs and the like are provided to seal openings in the walls of the gear chamber to prevent leakage of lubricant from the latter, the improvement which comprises, a wall of said gear chamber being provided with an opening, a plate member secured to the outer surface of said wall and closing said opening, which plate member is provided with a small opening to atmosphere, a collapsible diaphragm within said gear chamber, which diaphragm is generally concave shaped on the atmosphere side having a continuous marginal portion in sealing engagement with the inner surface of said plate member around the small opening formed therein for defining a collapsible chamber within said gear chamber, said diaphragm being collapsible in response to an increase in pressure developed in said gear chamber.

4. The construction according to claim 3 wherein said continuous marginal portion is contiguous with the periphery of the opening in the wall of the gear chamber.

5. The construction according to claim 3 wherein said continuous marginal portion is in the form of an outwardly extending flange, which flange is clamped between the inner surface of said plate member and the outer surface of said wall adjacent the periphery of the opening in the latter.

References Cited in the file of this patent

UNITED STATES PATENTS

| 1,900,553 | Hampton | Mar. 7, 1933 |
| 1,900,985 | Geisler | Mar. 14, 1933 |
| 1,932,511 | Clarke | Oct. 31, 1933 |
| 2,779,353 | Coffey | Jan. 29, 1957 |
| 2,830,832 | Moorman et al. | Apr. 15, 1958 |

FOREIGN PATENTS

| 305,811 | Switzerland | May 16, 1955 |